Nov. 21, 1967   E. A. ABEL, JR   3,353,425

WINDSHIELD WIPER DRIVE MECHANISM

Filed July 22, 1965   2 Sheets-Sheet 1

INVENTOR.
EDMUND A. ABEL JR.
BY
Hoffmann and Yount
ATTORNEYS

Nov. 21, 1967  E. A. ABEL, JR  3,353,425
WINDSHIELD WIPER DRIVE MECHANISM
Filed July 22, 1965  2 Sheets-Sheet 2

INVENTOR.
EDMUND A. ABEL JR.
BY
Hoffmann and Yount
ATTORNEYS

United States Patent Office 3,353,425
Patented Nov. 21, 1967

3,353,425
WINDSHIELD WIPER DRIVE MECHANISM
Edmund A. Abel, Jr., Rocky River, Ohio, assignor, by mesne assignments, to The Leece-Neville Company, Cleveland, Ohio, a corporation of Ohio
Filed July 22, 1965, Ser. No. 473,924
18 Claims. (Cl. 74—600)

The present invention relates to a drive mechanism and, more particularly, to a drive mechanism for windshield wipers of an automotive vehicle.

Known windshield wiper drive mechanisms for oscillating wiper blades of an automative vehicle are operable to move the wiper blades out of the normal range of vision of the operator of the vehicle to a park position when de-actuated. Such wiper drive mechanisms include a crank arm rotatable through an orbit for effecting normal oscillation of the wiper blades, and means for shifting the crank arm to effect movement of the wiper blades to their park position. These wiper blade drive mechanisms include a motor for rotating a driving member which eccentrically and rotatably supports the crank arm and is effective to rotate the crank arm, and a driving connection between the driving member and the crank arm operable to interrupt the drive to the crank arm when it is desired to move the wiper blades to their park position.

The principal object of the present invention is the provision of a new and improved windshield wiper drive mechanism, of the above-noted type, which is simple in construction, reliable in operation, durable, and operable to oscillate the wiper blades in a normal operating path and to move the wiper blades to a park position out of the normal line of vision of the operator of the vehicle.

A further object of the present invention is the provision of a new and improved windshield wiper drive mechanism having a crank arm adapted to be connected to operate the windshield wipers upon rotation thereof and a driving member for rotating the crank arm, and an arm member operatively connected with the crank arm and having a portion movable axially relative to the driving member between a drive position wherein it is in driving engagement with the driving member and effects rotation of the crank arm therewith, and a disengaged position wherein it is out of driving engagement with the driving member, and wherein it is effective to control movement of the crank arm to effect movement of the wiper blades to a park position.

A still further object of the present invention is the provision of a new and improved, simple reliable drive connection between a driving member and a crank arm of a windshield wiper drive mechanism including an arm member received in a driving recess in the driving member and connected to the crank arm to rotate the crank arm and which is moved out of the driving recess so as to effect shifting of the crank arm to effect movement of the wiper blades to their park position.

Another object of the present invention is the provision of a new and improved windshield wiper drive mechanism, as noted in the next preceding paragraph, wherein cam means is provided on the driving member for holding the arm in its position out of driving relationship with the driving member.

Still another object of the present invention is the provision of a new and improved windshield wiper drive mechanism wherein a cam mechanism is operable to move the arm member out of driving relationship with the driving member and includes a cam member movable into the path of movement of an arm member and which is effective to move the arm member out of driving relationship with the driving member so as to stop movement of the crank arm with the driving member.

Yet another object of the present invention is the provision of a new and improved wiper drive mechanism wherein the wiper blades are driven by a crank arm operatively connected with a radially movable arm member which has a driving connection with a rotatable driving member and wherein the arm member is moved out of driving relationship with the driving member and the driving member continues to operate so as to effect movement of the crank arm to a position wherein the wiper blades are in a park position and movement of the arm radially to a position wherein the arm actuates switch means to stop the rotation of the driving member.

Further objects and advantages of the present invention will be apparent to those skilled in the art to which it relates from the following detailed description of the preferred embodiment thereof made with reference to the accompanying drawings wherein.

Figure 1:
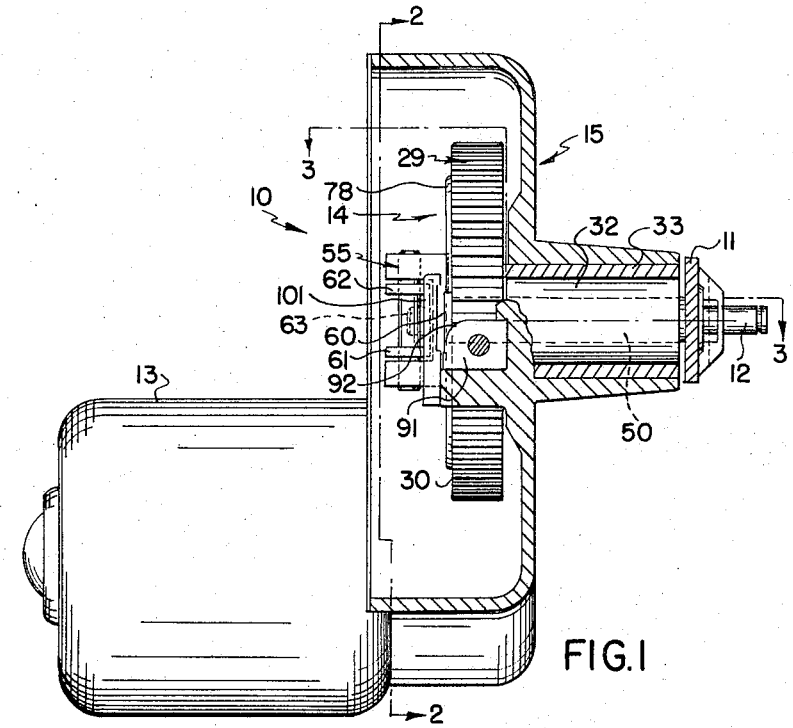
FIG. 1 is a side elevational view, partly in section, of a windshield wiper drive mechanism embodying the present invention.
Figure 2:
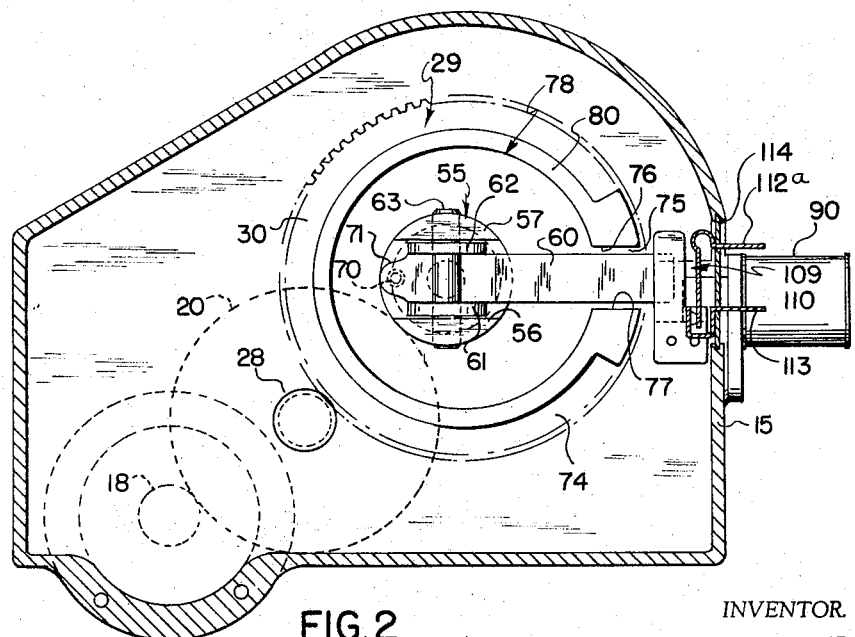
FIG. 2 is a sectional view of the windshield wiper drive mechanism shown in FIG. 1, taken approximately along the section line 2—2 of FIG. 1.

The present invention provides a windshield wiper drive mechanism which is effective to oscillate the windshield wiper blade means of an automative vehicle across the windshield of the automotive vehicle when energized and when de-energized is effective to move the windshield wiper blade means to a park position out of the normal line of vision of the operator of the vehicle. As representing the preferred embodiment of the present invention, the drawings illustrate a windshield wiper drive mechanism 10 having a crank cam 11 which carries a crank pin 12. The crank pin 12 is adapted to be connected to a suitable linkage mechanism for actuating windshield wiper blades of an automotive vehicle. The crank arm 11 is moved or rotated to effect movement of the wiper blades upon the actuation of a suitable electric motor 13 which effects actuation of the crank arm 11 through a suitable drive mechanism 14, supported by a housing 15.

The motor 13 comprises a suitable electric motor which is secured to a projecting portion 16 of the housing 15, and has an output shaft 17 which extends through the portion 16 of the housing and is rotatably supported thereby. The outer end of the output shaft 17 carries a pinion gear 18 which meshes with a pinion gear 20, which is supported on a pinion shaft 22. The pinion shaft 22 is rotatably carried by spaced portions 24 and 26 of the housing 15. The gear 20 is fixedly connected to the pinion shaft 22 and upon rotation of the gear 20, the pinion shaft 22 rotates therewith. The end of the pinion shaft 22 adjacent to the projecting portion 26 of the housing 15 carries a pinion gear 28. The pinion gear 28 meshes with a driving gear member 29.

The driving member 29 has a gear portion 30 and a hub portion 32 extending therefrom. The hub portion 32 of the driving member 29 is supported by a suitable sleeve bearing 33 in a hub supporting portion 34 of the housing 15. From the above description, it can readily be seen that upon energization of the motor 13, the driving gear 29 is rotated and specifically the hub portion 32 thereof is rotated about its centerline 36 relative to the projecting portion 34 of the housing 15.

The crank arm 11 is operatively connected to the driving member 29 so as to be moved upon rotation of the driving member 29. The crank arm 11 is connected to the driving member 29 by a suitable connecting drive mechanism 40 which effects rotation of the crank arm about the centerline 36 of the hub portion 32 to move the wiper blades of the automotive vehicle in a given oscillatory wiper path. The connecting drive mechanism 40 is also effective to move the crank arm 11 so that the wiper blades move into a park position out of the line of vision of the operator of the vehicle. The connecting drive mechanism 40 is a disconnectable or interruptable drive mechanism in that the drive mechanism connects the crank arm 11 to the driving member 29 for rotation with the driving member 29 to actuate operation of the wiper blades in their normal wiper path and is disconnected or interrupted to interrupt rotation of the crank arm with the driving member and cause the driving member to move the crank arm so that the wiper blades are, in turn, moved to their park position, as will be clear from the description hereinbelow.

The drive mechanism 40 includes a pin member 50 which is eccentrically carried by the hub portion 32 of the driving member 29. The pin member 50 extends through an opening or passageway 51 through the hub portion 32, which opening or passageway is eccentrically located with respect to the axis of rotation 36 of the driving gear. The centerline 52 of the passageway 51 is offset from the axis of rotation 36 of the crank arm 11 a distance designated X in FIG. 3. The pin member 50 which extends through the passageway 51 is rotatable therein relative to the hub portion 32 about its own axis.

Figure 3:
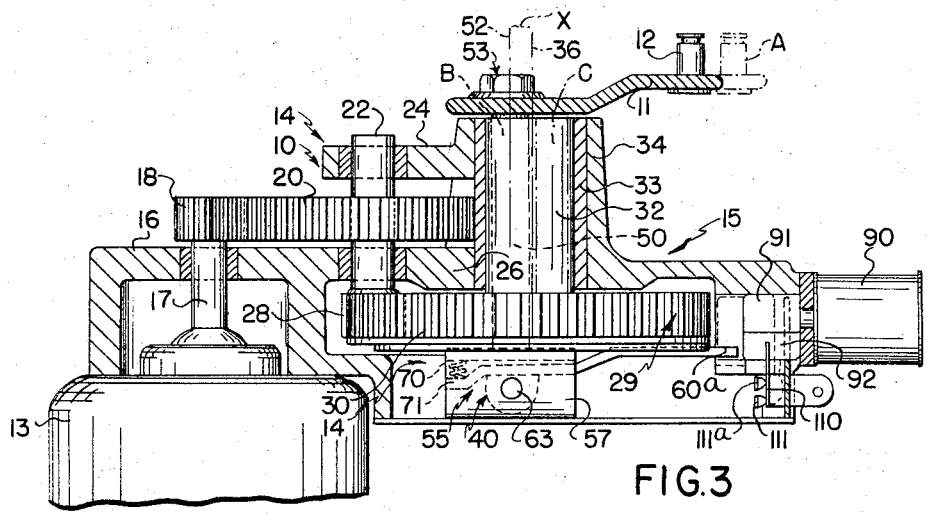
FIG. 3 is a sectional view of a windshield wiper drive mechanism shown in FIG. 1, taken approximately along the section line 3—3 of FIG. 1 with parts in elevation.
Figure 4:
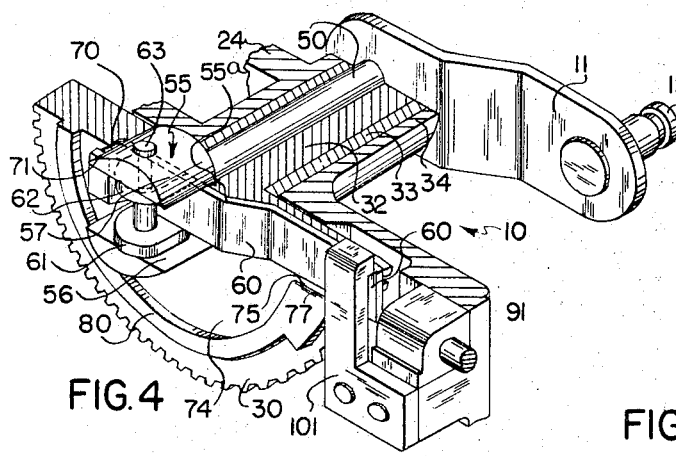
FIG. 4 is a sectional perspective view of a portion of the windshield wiper drive mechanism shown in FIG. 1.

The upper end of the pin member 50, as shown in FIG. 3, namely, the end of the pin member adjacent to the crank arm 11 projects beyond the hub 32 of the gear member 29 and is suitably secured to the crank arm 11 by means of a suitable bolt connection 53. The other end of the pin member 50 projects beyond the driving member 29 and carries a bracket member 55 thereon. The bracket member 55, as best shown in FIG. 4, includes a base portion 55a and a pair of projecting arm portions 56, 57 connected to the base portion 55a and which project axially away from the driving member 29 and which are in spaced relationship.

A drive arm member 60 for drivingly connecting the pin 50 and driving member 29 is carried by the bracket 55. The arm member 60 at the end thereof adjacent to the bracket 55 has a pair of projecting lug portions 61, 62 which extend parallel with the projecting portions 56, 57, respectively, of the bracket 55 and which are located in the space between the projecting portions 56, 57 and the bracket 55. A suitable pivot pin member 63 extends through aligned openings in the portions 56, 61 and 57, 62, and the arm member 60 is pivotally supported thereby for movement about the axis of the pivot pin member 63 and relative to the pin member 50 and driving member 29.

The arm member 60 is movable about the pin member 63 between a driving position wherein it is drivingly engaged or connected with the driving member 29 and rotates therewith and a released position out of driving engagement with the driving member 29. The arm member 60 is biased to its driving position by a suitable spring 70 which engages a lug portion 71 on the arm member 60. The spring 70 acts between the bracket 55 and the lug portion 71 of the arm and biases the arm member in a counterclockwise direction about the axis of the pivot pin member 63, as shown in FIG. 3. This causes the outer end 60a of the driving member to be biased toward a radially extending surface 74 of the driving member 29.

The arm member 60 when in its driving position has a driving relationship with the driving member 29 and specifically is received in a driving recess 75 formed on the surface 74 of the driving member 29. The driving recess 75 is defined by spaced axially extending surfaces 76, 77 on an arcuate cam pad 78 which extends circumferentially about the surface 74 of the driving member 29. The cam 78 extends almost completely around the surface 74 and the opposite ends thereof have surfaces 76, 77 defining the driving recess 75. The cam pad member 78 has a surface 80 which is located outwardly axially away from the surface 74 of the driving member 29, the purpose of which will be described hereinbelow.

From the above description, it should be apparent that the spring member 70 biases the arm member 60 into the driving recess 75 defined by the cam 78 and, thus, upon rotation of the driving member 29, the arm 60 rotates about the axis 36 of the driving member 29. Since the arm is connected with the pin 50, which, in turn, is connected with the crank arm 11, the pin 50 and crank arm 11 are, likewise, rotated about the axis 36 of the driving member 29, which causes the wiper blades to be moved in a normal wiper pattern.

Figure 5:
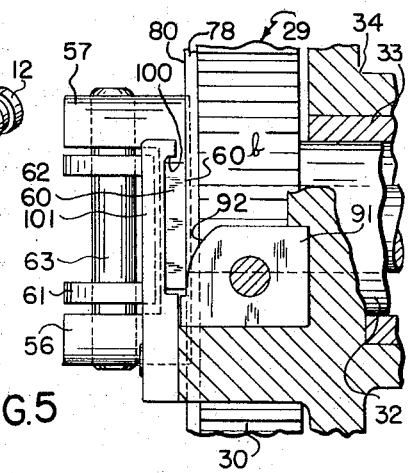
FIG. 5 is a fragmentary sectional view of the windshield wiper drive mechanism of FIG. 1 illustrating portions of the windshield wiper drive mechanism in an operative position.

When it is desired to move the wiper blades into their park position, it is necessary to interrupt or disconnect the connecting drive mechanism 40 between the driving member 29 and the crank arm 11. This disconnection is effected by moving the arm member 60 out of the driving recess 75 which is effected by a suitable means including a solenoid 90 carried by the housing 15. The solenoid 90, when actuated effects movement of a cam member 91 which is operatively connected to the solenoid and is moved upon energization of the solenoid radially toward the driving member 29 and outwardly from the driving member 29 when the solenoid 90 is de-energized. The cam member 91 is located so that when it moves toward the driving member 29, it moves into the path of rotation of the outer end 60a of the arm 60. The cam member 91 has a cam surface 92 thereon which in particular is moved into the path of movement of the end 60a of the arm member 60. When the cam surface 92 is in the path of movement of the arm members 60, the arm member 60 engages the surface 92 of the cam 91 and is cammed out of the driving recess 75 by the cam member 91 and to the position, best shown in FIG. 5, wherein the arm member 60 is located in a groove 100 in a bracket member 101 which is suitably secured to the housing 15. The bracket member 101 functions as a stop lug, and when the arm member 60 is located in the recess 100 in the bracket 101, the arm is held from movement with the driving member 29, and the driving member 29 continues rotation about its axis 36. On continued rotation of the driving member 29, the cam surface 80 of the cam 78 on the driving member 29 then engages the undersurface 60b of the arm 60 and thereby holds the arm in the recess 100 in the bracket 101 during the continued rotation of the driving member 29.

In the event that the solenoid 90 is energized at the particular moment when movement of the cam 91 will strike the outermost end of the arm member 60 and prevent inward movement thereof, when the arm 60 passes the cam 91, the cam 91 continues its movement inwardly into the path of movement of the arm member 60 so as to position the cam surface 92 thereof in the path of movement of the arm member 60 so that on the next rotation thereof it is moved out of the driving recess 75.

When the arm member 60 is moved out of driving relationship with the driving member 39 and into the recess 100 in the bracket 101, the continued rotation of the driving member 29 effects movement or shifting of the crank arm 11, to the dot-dash position designated A in FIG. 3, so as to move the wiper blades to their park position. This shifting movement of the crank arm is due to the pin member 50 being shifted from the position B, shown in FIG. 3, to the position designated C in FIG. 3 by the continued rotation of the hub 32 of the driving member 29. During this movement the pin member 50 rotates relative to the hub member 32. The shifting of the pin member 50 in this manner effects shifting of the crank arm 11 and shifting of the arm 60 therewith. Both the arm 60 and the crank arm 11 are shifted radially outwardly of the driving member by this movement of the pin member 50 and the outer end 60a of the arm member 60 moves from the dot-dash position shown in FIG. 6 to the full-line position shown in FIG. 6 radially of the driving member 29. This movement of the arm 60 and crank arm 11 occurs after approximately 180° of rotation of the driving member 29 after the arm 60 is moved from the driving recess.

Figure 6:
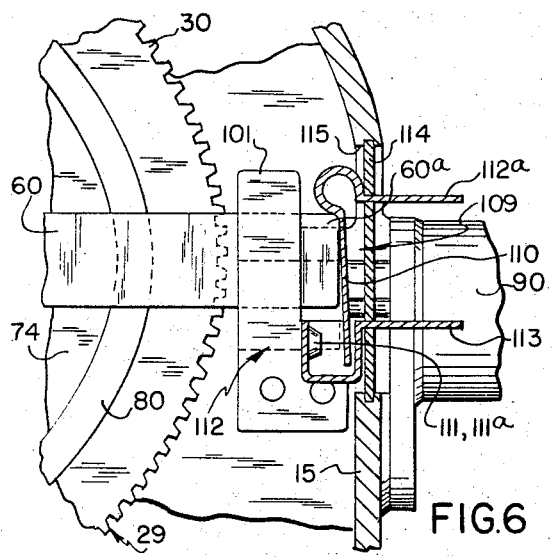
FIG. 6 is a fragmentary sectional view of the windshield wiper drive mechanism shown in FIG. 1, also showing operative positions of parts of the mechanism.

When the driving arm 60 moves to the full-line position shown in FIG. 6, it is operative to de-energize the motor 13 and the solenoid 90, and engages a resilient contact member 110 and moves the contact member 110 away from a pair of fixed contacts 111, 111a located within the housing 15 of the windshield wiper drive mechanism and forms a switch mechanism 112. The contacts 110 and 111, 111a are connected with suitable electrical connections 112a and 113, respectively, which extend through a suitable insulating member 114 which is located in an opening 115 in the housing 15. When the contacts 111, 111a and 110 are separated by movement of the arm member to its outer position, the circuit to the motor 13 is broken, thereby stopping the rotation of the driving member 29 and, at the same time, the circuit to the solenoid 90 is broken so as to de-energize the solenoid 90.

The operation of the windshield wiper mechanism described hereinabove will be clear from the following description of an electrical circuitry utilized for controlling the operation of the above-described mechanism. It should be apparent that when the windshield wiper mechanism is not operating, the arm member 60 is in its disconnected position holding the contacts 111, 111a and 110 of the switch means 112 out of engagement. In this position, the double-pole control switch 120 will be in the park position illustrated in FIG. 7 with contacts 120a, 120b closed and the switch contacts 111, 110 and 111a, 110 of the switch means 112 will be open.

Figure 7:
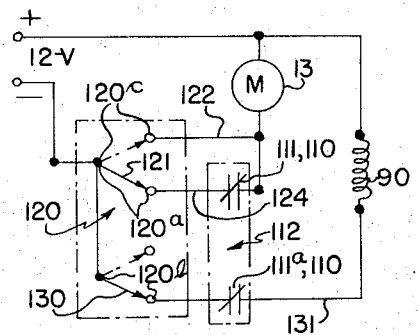
FIG. 7 is a schematic electrical diagram illustrating the circuit embodied in the windshield wiper drive mechanism of FIG. 1.

In order to energize the windshield wiper mechanism, the switch 120 is moved to its dot-dash position shown in FIG. 7. When the switch 120 is moved to its dot-dash position, contacts 120a, 120b of the switch are opened and contacts 120c are closed and a circuit is completed through the switch member 121 of the switch 120, contacts 120c, conductor 122, and motor 13, thereby energizing the motor 13 and effecting rotation of the driving member 29. The rotation of the driving member 29 for approximately 180° effects shifting of the pin member 50 from the position C shown in FIG. 3 to the position B shown in FIG. 3. This shifting of the pin member 50 causes the arm member 60 and the crank arm 11 to be moved radially inwardly to their operating positions, shown in full lines in FIG. 3. The spring member 70 biases the arm member 60 into the driving recess 75 defined by the cam 77, thereby effecting the normal oscillatory motion of the wiper blades by rotation of the crank arm 11. When the arm 60 moves radially inwardly, the switch contacts 111, 110 and 111a, 110 close. However, no circuits are completed since these contacts are in series with the now open contacts 120a, 120b.

In order to de-energize the windshield wiper mechanism, the control switch 120 is moved to its park position shown in full lines in FIG. 7. When moved to its full-line position shown in FIG. 7, contacts 120c are opened, while contacts 120a, 120b are closed. Even though contacts 120c are opened, the motor 13 remains energized due to the completion of a circuit to the motor through the control member 121 and conductor 124 and now closed contacts 111, 110 of the switch means 112.

A circuit is also completed through control member 130 of switch 120, contacts 111a, 110 of the switch means 112, conductor 131, and solenoid coil 90 to energize the solenoid 90 to effect movement of the cam member 91 into the path of rotary movement of the arm 60. As described hereinabove, the movement of the cam member causes the arm to be disconnected from the driving member 29 and upon continued rotation of the driving member 29 effects movement of the arm member to a position wherein it opens contacts 110, 111 and 110, 111a of the switch 112. When these contacts of the switch 112 open, the circuits to the motor 13 and to the solenoid 90 are broken and the motor 13 is de-energized, as well as the solenoid, thereby causing the motor to stop with the arm member in the position shown in full lines in FIG. 6 and causing retraction of the cam member 91, due to the deenergization of the solenoid 90.

The preferred embodiment of the present invention has been described hereinabove in considerable detail and it should be understood that modifications, adaptations, and changes therein may be made by those skilled in the art to which it relates, and it is hereby intended to cover all such adaptations, modifications, and changes coming within the scope of the appended claims.

What is claimed is:

1. A windshield wiper drive mechanism for moving windshield wiper blade means through a normal wiper path and to a park position out of the normal wiper path comprising a rotatable driving member rotatable about its axis, a crank arm carried by said driving member and adapted to effect movement of the wiper blade means upon movement thereof and rotatably supported eccentrically thereof, means operatively interconnecting said crank arm and said driving member including a drive member having a portion movable relative to said driving member between a first position in driving relationship with said driving member wherein said driving member, crank arm, and drive member rotate together about the axis of said driving member to effect movement of the wiper blade means through its normal wiper path and a second position spaced axially of said first position and out of driving relationship with said driving member wherein said driving member rotates relative to said drive member and crank arm, means supporting said drive member to provide for said movement of said portion of said drive member, and means for moving said drive member from its said first position to its said second position and for holding said member in said second position wherein said driving member continues rotation relative to said drive member and crank arm to effect movement of the wiper blade means to its park position.

2. A windshield wiper drive mechanism for moving windshield wiper blade means through a normal wiper path and to a park position out of the normal wiper path comprising a rotatable driving member rotatable about its axis, a crank arm carried by said driving member and adapted to effect movement of the wiper blade means upon movement thereof and rotatably supported eccentrically thereof, means interconnecting said driving member and said crank arm including a drive member supported for pivotal movement about an axis extending transverse to the axis of said driving member and relative to said crank arm and driving member between a first position in driving relationship with said driving member wherein said driving member, crank arm, and drive member rotate together about the axis of said driving member to effect movement of the wiper blade means through its normal wiper path and a second position out of driving relationship with said driving member wherein said driving member rotates relative to said drive member and crank arm, and means for moving said drive member from its said first position to its said second position and for holding said member in said second position whereby said driving member continues rotation relative to said drive member and crank arm to effect movement of the wiper blade means to its park position.

3. A windshield wiper drive mechanism for moving windshield wiper blade means through a normal wiper path and to a park position out of the normal wiper path comprising a rotatable driving member rotatable about its axis, a pin member carried by said driving member and extending axially therethrough and rotatably supported eccentrically thereof, a crank arm fixedly secured to one end of said pin member and adapted to effect movement of the wiper blade means upon movement thereof, a drive member connected to the other end of said pin member for pivotal movement about an axis extending transverse to the axis of said pin member and relative to said pin member and driving member between a first position in driving relationship with said driving member wherein said driving member, crank arm, and drive member rotate together about the axis of said driving member to effect movement of the wiper blade means through its normal wiper path and a second position out of driving relationship with said driving member wherein said driving member rotates relative to said drive member and crank arm, and means for moving said drive member from its said first position to its said second position and for holding said member in said second position whereby said driving member continues rotation relative to said drive member and crank arm to effect movement of the wiper blade means to its park position.

4. A windshield wiper drive mechanism as defined in claim 3 wherein said wiper drive mechanism further includes spring means biasing said drive member into its said first position and said means for moving said drive member from its first position to its second position overcomes said spring means.

5. A windshield wiper drive mechanism as defined in claim 3 wherein a radially extending face of said drive member includes means defining a driving recess in which said drive member is located when in said first position to provide said driving connection between said driving member and said drive member.

6. A windshield wiper drive mechanism as defined in claim 5 further including spring means biasing said drive member into its said first position in said driving recess and said means for moving said drive member from its first position overcomes said spring means.

7. A windshield wiper drive mechanism as defined in claim 6 wherein said radially extending face of said driving member includes cam pad means spaced from said driving recess and engageable with said drive member when in its second position to hold said drive member in said second position against the bias of said spring means as said driving member continues rotation after said drive member has been moved from said driving recess.

8. A windshield wiper drive mechanism comprising a rotatable driving member rotatable about its axis, a crank arm carried by said driving member and rotatably supported eccentrically thereof, means operatively connected with said crank arm and said driving member and including a driving arm having a portion movable relative to said driving member and crank arm between a first position in driving relationship with said driving member wherein said driving member, crank arm and drive arm rotate together about the axis of said driving member and a second position spaced axially of said first position out of driving relationship with said driving member wherein said driving member rotates relative to said drive arm and crank arm, means supporting said drive member to provide for said movement of said portion of said drive member, and cam means movable from a retracted position to an actuated position in the path of rotary movement of said drive arm when in its first position and having a cam surface cooperable with the drive arm to move the drive arm from its said first position to its said second position.

9. A windshield wiper drive mechanism as defined in claim 8 wherein said drive arm is connected with said crank arm for pivotal movement about an axis extending transverse to the axis of said driving member and is moved about said pivot axis upon movement of said cam means from its retracted position.

10. A windshield wiper drive mechanism as defined in claim 8 wherein said drive arm when in its second position is engaged by a stop lug means for preventing further rotation thereof upon continued rotation of the driving member.

11. A windshield wiper drive mechanism as defined in claim 8 further including solenoid means associated with said cam means for moving said cam means between its retracted position and its actuated position.

12. A windshield wiper drive mechanism comprising a rotatable driving member rotatable about its axis, a crank arm carried by said driving member and rotatably supported eccentrically thereof, a drive arm connected with said crank arm for pivotal movement about an axis extending transverse to the axis of said driving member and relative to said crank arm and driving member between a first position in driving relationship with said driving member and crank arm wherein said driving member, crank arm and drive arm rotate together about the axis of said driving member and a second position out of driving relationship with said driving member wherein said driving member rotates relative to said drive arm and crank arm and shifts said drive arm and crank arm radially on said driving member, cam means movable into the path of rotary movement of said drive arm and effective to engage said drive arm and move said drive arm from its first to its said second position, solenoid means for moving said cam into the path of movement of said drive arm, and circuit means for energizing said solenoid means including contacts opened to de-energize said solenoid means in response to said arm member moving radially outwardly of said drive member to a predetermined position.

13. A windshield wiper drive mechanism comprising a rotatable driving member rotatable about its axis, electrical motor means energizable to rotate said driving member, a crank arm carried by said driving member and rotatably supported eccentrically thereof, means operatively connected with said crank arm and said driving member and including a drive arm having a portion movable relative to said driving member and crank arm between a first position in driving relationship with said driving member wherein said driving member, crank arm and drive arm rotate together about the axis of said driving member and a second position spaced axially of said first position out of driving relationship with the driving member wherein said driving member rotates relative to said drive arm and crank arm to effect radial movement of said drive arm and crank arm relative to said driving member, means supporting said drive arm to provide for said movement of said portion of said drive arm, cam means movable from a retracted position into the path of rotary movement of the drive arm when in its said first position and having a cam surface cooperable with the rotating drive arm for moving the drive member from its said first position to its said second position, solenoid means actuatable to move said cam means from its retracted position into the path of movement of said drive arm, and circuit means for said motor means and said solenoid means and including contacts opened to de-energize said solenoid means and said motor means in response to radial movement of said drive arm to a predetermined position.

14. A windshield wiper drive mechanism as defined in claim 13 wherein said driving member carries a pin member extending axially therethrough and rotatably supported eccentrically thereof with said crank arm being fixedly secured to one end of said pin member and said drive arm pivotally connected to the other end of said pin member for pivotal movement about an axis extending transverse to the axis of said driving member.

15. A windshield wiper drive mechanism as defined in claim 13 wherein said driving member includes a radially extending face having means defining a driving recess in which said drive arm is located when in said first position to establish a driving connection between said driving member and said drive member.

16. A windshield wiper drive mechanism as defined in claim 15 further including spring means biasing said drive arm into its said first position in said driving recess and said means for moving said drive arm from its first position overcomes said spring means, and stop lug means engageable with said drive arm to block rotation thereof when in its said second position.

17. A windshield wiper drive mechanism as defined in claim 16 wherein said radially extending face of said driving member includes a cam pad means engageable with said drive arm when in its second position to hold said drive arm in said second position against the bias of said spring means during continued rotation of said driving member.

18. A windshield wiper drive mechanism comprising a driving member comprising a gear portion and a hub portion and rotatable about the axis of said hub portion, electrical motor means for rotating said driving member, a pin member extending axially through said hub portion and gear portion of said driving member and rotatably and eccentrically supported thereby, a crank arm fixedly secured to one end of said pin member, a bracket member carried on the other end of said pin member, a drive arm member extending radially of said driving member and adjacent one radially extending surface of said gear portion and pivotally carried by said bracket member, said arm member being pivotally supported by said bracket member for pivotal movement about an axis extending transverse to the axis of said driving member and movable about said pivot axis between a first position in driving relationship with said gear portion of said driving member wherein said driving member, arm member and crank arm rotate about the axis of the driving member and a second position out of driving relationship with the driving member wherein said driving member rotates relative to said arm member and crank arm to shift said arm member and crank arm radially, spring means acting between said arm member and said bracket means and biasing said arm member into its said first position, said radially extending surface of said drive member having means defining a driving recess in which said arm member is located when in its said position and to which said arm member is biased by said spring means, cam means movable from a retracted position to a position in the path of rotary movement of said arm member when said arm member is located in said driving recess and having a cam surface engageable with the arm member to move the arm member from said driving recess to its said second position upon rotation thereof relative to said cam surface, said radially extending surface of said driving gear portion having an arcuate cam pad means extending therearound and engageable with said arm member to hold said arm member in its said second position out of said driving recess, stop lug means defining a recess into which said arm member is moved by said cam means and holding said arm member against rotation with said driving member, solenoid means for effecting movement of said cam means from its retracted position into the path of movement of said arm member, and circuit means for energizing said motor means and said solenoid means and including contacts opened in response to radial movement of said arm member after approximately 180° of rotation of said driving member relative to said arm member for effecting de-energization of said solenoid means and said motor means.

References Cited
UNITED STATES PATENTS 3,091,128   5/1963   De Rees et al. _____ 74—600
3,242,520   3/1966   Carroll et al. _____ 74—600

FRED C. MATTERN, JR., *Primary Examiner.*

W. S. RATLIFF, *Assistant Examiner.*